United States Patent
Bai et al.

(10) Patent No.: US 11,441,062 B1
(45) Date of Patent: Sep. 13, 2022

(54) MODIFIED POLYVINYL ACETATE AND PREPARATION METHOD AND USE THEREOF AND OIL-BASED DRILLING FLUID

(71) Applicant: Southwest Petroleum University, Chengdu (CN)

(72) Inventors: Yang Bai, Chengdu (CN); Chunyan Liu, Chengdu (CN); Pingya Luo, Chengdu (CN); Gang Xie, Chengdu (CN); Danchao Huang, Chengdu (CN); Dezhi Liu, Chengdu (CN); Hongbo Li, Chengdu (CN); Daoxiong Li, Chengdu (CN); Chaowei Hu, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 17/647,041

(22) Filed: Jan. 5, 2022

(30) Foreign Application Priority Data

Sep. 6, 2021 (CN) .......................... 202111037939.1

(51) Int. Cl.
*C08F 297/02* (2006.01)
*C09K 8/34* (2006.01)
*C08F 218/08* (2006.01)

(52) U.S. Cl.
CPC .............. *C09K 8/34* (2013.01); *C08F 218/08* (2013.01); *C08F 297/026* (2013.01); *C08F 2810/50* (2013.01)

(58) Field of Classification Search
CPC ........................... C08F 218/08; C08F 297/026
See application file for complete search history.

(56) References Cited

U.S. PATENT DOCUMENTS 4,073,995 A * 2/1978 Baatz .................. D06M 15/285
526/287

* cited by examiner

*Primary Examiner* — Mark S Kaucher
(74) *Attorney, Agent, or Firm* — Sughrue Mion, PLLC

(57) ABSTRACT

A method of preparing a modified polyvinyl acetate includes subjecting a mixed liquor L1 containing a functional monomer to a first reaction with a first vinyl acetate monomer, followed by adding a first initiator to carry out a second reaction to obtain a mixed liquor L2; subjecting an acrylate monomer, a second vinyl acetate monomer, a second initiator and the mixed liquor L2 to carry out a third reaction to obtain a mixed liquor L3; and subjecting a third initiator and the mixed liquor L3 to carry out a fourth reaction under the air-tight and ultrasonic conditions. The functional monomer is selected from acrylic acid, oleic acid or butenedioic acid. Uses of modified polyvinyl acetate obtained by the method and oil-based drilling fluid containing the modified polyvinyl acetate are also disclosed.

18 Claims, No Drawings

MODIFIED POLYVINYL ACETATE AND PREPARATION METHOD AND USE THEREOF AND OIL-BASED DRILLING FLUID

CROSS REFERENCE TO RELATED APPLICATION

The application claims priority to Chinese Application No. 202111037939.1, filed on Sep. 6, 2021, entitled "modified polyvinyl acetate and preparation method and use thereof and oil-based drilling fluid", which is herein specifically and entirely incorporated by reference.

FIELD

The present disclosure relates to the technical field of oilfield chemistry, and in particular to a modified polyvinyl acetate, a preparation method and use thereof, and an oil-based drilling fluid.

BACKGROUND

The exploitation of oil and gas reservoirs in complex formations and deep strata and unconventional oil and gas reservoirs has become commonplace along with an increasing energy demands, in particular the shale gas and shale oil, has emerged as the promising energy sources in recent years. However, given that the most of the shale formations pertain to the hard and brittle formations with development of micro-pores and cracks and the strong water sensitivity, the wall instability accidents such as well collapse, hole shrinkage are highly prone to occur during the process of drilling the horizontal wells with large displacement at the deep stratum. In order to maintain stability of borehole wall, the drilling operation of the shale well sections mainly use oil-based drilling fluids with excellent inhibition properties, and it is generally necessary to add a plugging agent into the oil-based drilling fluid so as to further improve the plugging capability.

There are many plugging agents for water-based drilling fluids with significant effects at present, but the plugging agents are not suitable for use in the oil-based drilling fluid systems, the plugging agents exhibit poor dispersion properties in the oil-based drilling fluid systems and are prone to form an agglomeration phenomenon, resulting in an increased particle size of the plugging agent and an inability to meet the plugging requirements for micro-pores or cracks. In addition, the plugging agents have poor compatibility with the oil-based drilling fluid systems, which results in that the overall systems do not meet the drilling performance requirements, causing a series of complex accidents such as instability of the wellbore wall.

High temperature and high pressure environment place higher requirements on the temperature resistance of the oil-based drilling fluids used during a process of drilling shale at deep stratum, and the oil-based drilling fluids with better filtrate loss property and plugging performance are required for addressing the problem of borehole wall instability. Therefore, it has important and practical significance for the drilling of deep wells and ultra-deep wells to provide a plugging agent with desirable dispersibility, strong plugging effect and excellent high temperature resistance in the oil-based drilling fluids.

SUMMARY

The present disclosure aims to overcome the problems in regard to poor plugging effect and insufficient high temperature resistance of the plugging agents used in the oil-based drilling fluids in the prior art, and provide a modified polyvinyl acetate, a preparation method and use thereof and an oil-based drilling fluid.

In order to fulfill the above purpose, a first aspect of the present disclosure provides a method of preparing a modified polyvinyl acetate including:

(1) subjecting a mixed liquor L1 comprising a functional monomer to a first reaction with a first vinyl acetate monomer, then adding a first initiator to carry out a second reaction to obtain a mixed liquor L2;

(2) subjecting an acrylate monomer, a second vinyl acetate monomer, a second initiator and the mixed liquor L2 to carry out a third reaction to obtain a mixed liquor L3;

(3) subjecting a third initiator and the mixed liquor L3 to carry out a fourth reaction under the airtight and ultrasonic conditions, subsequently heating products produced by the fourth reaction to carry out a fifth reaction to obtain a mixed liquor L4;

(4) subjecting the mixed liquor L4 to a product extraction treatment to prepare a modified polyvinyl acetate;

wherein the functional monomer is selected from acrylic acid, oleic acid or butenedioic acid.

A second aspect of the present disclosure provides a modified polyvinyl acetate produced with the aforementioned method.

A third aspect of the present disclosure provides a use of the aforementioned modified polyvinyl acetate as a plugging agent in an oil-based drilling fluid.

A fourth aspect of the present disclosure provides an oil-based drilling fluid comprising the aforementioned modified polyvinyl acetate.

Due to the above technical solution, the modified polyvinyl acetate provided by the present disclosure has the following favorable effects:

(1) The modified polyvinyl acetate has higher lipophilicity, better dispersion effect in an oil-based drilling fluid system, and effectively solves the problem that the plugging agent is prone to agglomerate in the oil-based drilling fluids.

(2) The modified polyvinyl acetate can improve the plugging performance of the oil-based drilling fluid with a high temperature resistance up to 220° C., such that the oil-based drilling fluid system has improved stability and rheology, can efficiently reduce the filtrate loss, the formed mud cake is smooth and dense and has a low permeability, thereby effectively plugging the target stratum.

(3) The reaction conditions of the method are mild, and the products are non-toxic and environmentally friendly.

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

The following content provides a detailed description of the embodiments of the present disclosure. It should be understood that the embodiments described herein merely serve to illustrate and explain the present disclosure, instead of imposing limitations thereto.

In a first aspect, the present disclosure provides a method of preparing a modified polyvinyl acetate including:

(1) subjecting a mixed liquor L1 comprising a functional monomer to a first reaction with a first vinyl acetate monomer, then adding a first initiator to carry out a second reaction to obtain a mixed liquor L2;

(2) subjecting an acrylate monomer, a second vinyl acetate monomer, a second initiator and the mixed liquor L2 to carry out a third reaction to obtain a mixed liquor L3;

(3) subjecting a third initiator and the mixed liquor L3 to carry out a fourth reaction under the airtight and ultrasonic conditions, subsequently heating products produced by the fourth reaction to a fifth reaction to obtain a mixed liquor L4;

(4) subjecting the mixed liquor L4 to a product extraction treatment to prepare a modified polyvinyl acetate;

wherein the functional monomer is selected from acrylic acid, oleic acid or butenedioic acid.

In some embodiments of the present disclosure, the mixed liquor L1 in step (1) is obtained by mixing deionized water with a functional monomer, preferably the deionized water is mixed with the functional monomer in a weight ratio of (6-10):(0.1-0.3), further preferably (7-9):(0.24-0.3). The mixed liquor L1 preferably has a pH of 5-6. The mixing process is not particularly defined in the present disclosure, as long as the deionized water and the functional monomer can form the mixed liquor L1 which is homogenous and stable, for instance, the mixing may be performed using an ultrasonic stirrer at an ambient temperature. In the present disclosure, the ambient temperature refers to 20-25° C.

In some embodiments of the present disclosure, the first reaction in step (1) is preferably performed in a water bath reactor, the conditions of the first reaction comprise a temperature of 60-90° C. and a time of 15-20 min.

In some embodiments of the present disclosure, after the first reaction in step (1) is accomplished, a first initiator is added into the resulting product system to carry out a second reaction to obtain a mixed liquor L2. The conditions of the second reaction comprise a temperature of 60-90° C. and a time of 40-60 min.

The present disclosure adopts a mode of adding vinyl acetate monomer and initiator in separate batches in the specific polymerization step. The vinyl acetate monomer is added in two batches, (i.e., the first vinyl acetate monomer and the second vinyl acetate monomer), the weight ratio of the first vinyl acetate monomer to the second vinyl acetate monomer is preferably 1:(2-3); and the initiator is sequentially added in three batches (i.e., the first initiator, the second initiator and third initiator), the weight ratio of the first initiator:second initiator to the third initiator is preferably 1:(0.2-0.7):(3-4).

In the present disclosure, the functional monomer may be selected from acrylic acid, oleic acid or butenedioic acid, preferably acrylic acid.

In the present disclosure, the first initiator, the second initiator and the third initiator are the same and are selected from the aqueous solutions of sodium persulfate, potassium persulfate, ammonium persulfate, hydrogen peroxide or benzoyl peroxide, more preferably an aqueous solution of ammonium persulfate. For example, an aqueous solution obtained by diluting ammonium persulfate with 10 times of water by mass can be used.

In some embodiments of the present disclosure, prior to the third reaction in the step (2), it is preferable that the acrylate monomer is sufficiently blended with the second vinyl acetate monomer to form a mixture, when the second reaction in step (1) is finished and there is not a reflux, the mixture and the second initiator are simultaneously added into the mixed liquor L2 at their uniform feed rates so as to perform a third reaction. The feeding of the mixture and the second initiator is implemented throughout the whole process of the third reaction until the reaction is terminated to obtain a mixed liquor L3. Preferably, the conditions of the third reaction comprise a temperature of 60-90° C. and a time of 150-240 min.

In the present disclosure, the acrylate monomer may be selected from the group consisting of ethyl acrylate, butyl acrylate, isooctyl acrylate, lauryl methacrylate or n-octyl methacrylate, preferably butyl acrylate.

In some embodiments of the present disclosure, the fourth reaction in step (3) is carried out under the airtight and ultrasonic conditions, it is preferable to place the mixed liquor L3 in an airtight ultrasonic reactor, turn on the ultrasound and simultaneously add a third initiator to carry out the fourth reaction. The airtight ultrasonic conditions are kept for the same time length as the fourth reaction. Preferably, the airtight and ultrasonic conditions include a frequency of 26,000-35,000 Hz, a temperature of 60-65° C. and a time of 3-8 min, and the conditions of the fourth reaction comprise a temperature of 60-90° C. and a time of 30-45 min.

In some embodiments of the present disclosure, the ultrasonic treatment is closed after completion of the fourth reaction in step (3), the product obtained from the fourth reaction is subjected to an elevated temperature to initiate a fifth reaction after reaching the prescribed temperature. Preferably, the conditions of the fifth reaction comprise a temperature of 90-110° C. and a time of 30-40 min.

In the present disclosure, the mixed liquor L4 obtained after the fifth reaction is white or milky white mixed liquor.

In the present disclosure, in order to produce the better polymerization effects and a product having superior dispersibility, high temperature resistance and plugging performance, the mass ratio of vinyl acetate monomer (including the first vinyl acetate monomer and the second vinyl acetate monomer):initiator (including the first initiator, the second initiator and third initiator):acrylate monomer:functional monomer is preferably (1.5-3):(0.05-0.07):(0.3-0.5):(0.1-0.3), more preferably (2.6-3):(0.055-0.062):(0.45-0.5):(0.24-0.3).

In some embodiments of the present disclosure, the product extraction process in the step (4) comprises neutralizing the mixed liquor L4 with lime water until the pH of the mixed liquor is neutral, subsequently washing and drying the product, and grinding the dried product to obtain a powdered product, which is exactly the modified polyvinyl acetate. The washing, drying, and grinding modes are not particularly limited in the present disclosure and may be performed in a conventional manner in the art, for example, drying at 60-75° C. for 20-28 hours in a vacuum oven and then performing sufficient grinding in a mortar.

In a second aspect, the present disclosure provides a modified polyvinyl acetate produced with the aforementioned method, wherein the modified polyvinyl acetate has an average particle size of 65-100 nm, preferably 65-93 nm, The modified polyvinyl acetate has a strong lipophilicity.

In a third aspect, the present disclosure provides a use of the aforementioned modified polyvinyl acetate as a plugging agent in an oil-based drilling fluid.

In a fourth aspect, the present disclosure provides an oil-based drilling fluid comprising the aforementioned modified polyvinyl acetate.

In some embodiments of the present disclosure, the oil-based drilling fluid comprises the following ingredients: 100 parts by weight of base fluid, 15-20 parts by weight of water, 3-6 parts by weight of organic soil, 1-3 parts by weight of emulsifier, 2-4 parts by weight of wetting agent, 1-4 parts by weight of the modified polyvinyl acetate, 15-35 parts by weight of weighting agent, 3-5 parts by weight of filtrate reducer, 1-3 parts by weight of calcium oxide.

In the oil-based drilling fluid formulation described above, the base fluid may be selected from No. 3 white oil, No. 5 white oil or diesel oil, preferably No. 3 white oil; the organic soil may be an oleophilic clay prepared through an interaction of a hydrophilic bentonite and a quaternary ammonium salt cationic surfactant; the emulsifier may be at least one selected from the group consisting of cis-octadec-9-enoic acid, Span-80, sodium dodecylbenzenesulfonate, LS-65 and calcium alkylbenzenesulfonate, LS-65 is preferably mixed with Span-80 in a mass ratio (2-4):(2-5); the wetting agent is lecithin; the weighting agent may be at least one selected from the group consisting of API barite, ultrafine barium sulfate, magnetite powder, titaniferous powder and trimanganese tetroxide; the API barite is preferably mixed with ultrafine barium sulfate in a mass ratio (5-7):(2-3); the filtrate reducer may be an oxidized asphalt or a sulfonated asphalt.

In the present disclosure, the LS-65 is an oil-based drilling fluid emulsifier with a brand name LS-65 commercially available from Nanjing Ruichuang Chemical Technology Co., Ltd. The emulsifier comprises an anionic surfactant and a non-anionic surfactant.

The oil-based drilling fluids provided by the present disclosure have excellent plugging performance, desirable rheological property and a temperature resistance up to 220° C.

The present disclosure will be described in detail below with reference to examples. In the following preparation examples, examples and comparative examples.

No. 3 white oil: it has a brand name LN-3 and is commercially available from Mojiezuo Petrochemical (Shanghai) Co., Ltd.

Organic soil: it has a brand name 708 and is commercially available from Sichuan Southwest Shida Jinniu Petroleum Technology Co., Ltd.

LS-65: an oil-based drilling fluid emulsifier with a brand name LS-65 commercially available from the Nanjing Ruichuang Chemical Technology Co., Ltd.

Lecithin: it has a brand name LL05733 and is commercially available from Shanghai Aladdin Biochemical Technology Co., Ltd.

Filtrate reducer: it has a brand name LB-10 and is commercially available from Foshan Luzheng Asphalt Co., Ltd.

API barite: it has a brand name 02 and commercially available from Sichuan Hongjian Xinyi Technology Co., Ltd.

Ultrafine barium sulfate: purchased from Nano Powder Industry Co., Ltd.

Commercially available nano-graphene: it has a brand Name HQNANO-001 and is purchased from Sichuan Southwest Shida Jinniu Petroleum Technology Co., Ltd.

Commercially available ordinary polyvinyl acetate: PVAC Industrial grade, purchased from Shandong Wangsheng New Material Technology Co., Ltd.

Commercially available nano-calcium carbonate: it has a brand name CCRA and is purchased from Chengdu Kelong Chemical Co., Ltd.

Commercially available Oxidized asphalt: it has a brand name LB-10 and is purchased from Foshan Luzheng Asphalt Co., Ltd.

Unless otherwise specified, each of the other materials in use is a commercially available ordinary product.

Preparation Example 1

(1) Deionized water and acrylic acid were placed and blended in an ultrasonic stirrer at room temperature to obtain a homogeneous mixed liquor L1 (with a pH of 5-6); the mixed liquor L1 was disposed in a water bath reactor and a first vinyl acetate monomer was added, the mixture was stirred, mingled and heated to carry out a first reaction (under the reaction temperature 75° C. for 15 min); a first initiator was subsequently added to perform a second reaction (under the reaction temperature 75° C. for 40 min) to obtain a mixed liquor L2;

(2) Butyl acrylate was sufficiently blended with a second vinyl acetate monomer to form a mixture, when the second reaction in step (1) was finished and there was not a reflux, the mixture and a second initiator were simultaneously added into the mixed liquor L2 at their uniform feed rates so as to perform a third reaction (under the reaction temperature 75° C. for 150 min), the feeding of the mixture and the second initiator was implemented throughout the whole process of the third reaction until the reaction was terminated to obtain a mixed liquor L3;

(3) The mixed liquor L3 was placed in an airtight ultrasonic reactor, the ultrasound (the frequency was 30,000 Hz, the temperature was 60° C., and the time was 4 min) was turned on and a third initiator was added simultaneously to perform a fourth reaction (under the reaction temperature 75° C. for 30 min); the resulting product of the fourth reaction was then heated to carry out a fifth reaction (under the reaction temperature 100° C. for 30 min), the reaction product was naturally cooled after completion of the reaction to obtain the mixed liquor L4;

(4) Neutralization of the mixed liquor L4 to pH neutral was performed with lime water, the product was subjected to washing with deionized water and then drying at 60° C. in a vacuum oven for 20 h, and subsequently subjected to sufficient grinding in a mortar to prepare a modified polyvinyl acetate (denoted as S1);

Wherein the mass ratio of the deionized water:the vinyl acetate monomer (the first vinyl acetate monomer and the second vinyl acetate monomer):the initiator (the first initiator, the second initiator and third initiator):the butyl acrylate:the acrylic acid was 1:2.8:0.06:0.45:0.25; the weight ratio of the first vinyl acetate monomer:the second vinyl acetate monomer was 1:2; the initiator was an aqueous solution of ammonium persulfate (the weight ratio of ammonium persulfate:water was 1:10), wherein the weight ratio of the first initiator:the second initiator:the third initiator was 1:0.35:3.45.

Preparation Example 2

(1) Deionized water and acrylic acid were placed and blended in an ultrasonic stirrer at room temperature to obtain a homogeneous mixed liquor L1 (with a pH of 5-6); the mixed liquor L1 was disposed in a water bath reactor and a first vinyl acetate monomer was added, the mixture was stirred, mingled and heated to carry out a first reaction (under the reaction temperature 85° C. for 20 min); a first initiator was subsequently added to perform a second reaction (under the reaction temperature 85° C. for 60 min) to obtain a mixed liquor L2;

(2) Butyl acrylate was sufficiently blended with a second vinyl acetate monomer to form a mixture, when the second reaction in step (1) was finished and there was not a reflux, the mixture and a second initiator were simultaneously added into the mixed liquor L2 at their uniform feed rates so as to perform a third reaction (under the reaction temperature 85° C. for 210 min), the feeding of the mixture and the second initiator was implemented throughout the whole process of the third reaction until the reaction was terminated to obtain a mixed liquor L3;

(3) The mixed liquor L3 was placed in an airtight ultrasonic reactor, the ultrasound (the frequency was 35,000 Hz, the temperature was 60° C., and the time was 6 min) was turned on and a third initiator was added simultaneously to perform a fourth reaction (under the reaction temperature 85° C. for 45 min); the resulting product of the fourth reaction was then heated to carry out a fifth reaction (under the reaction temperature 110° C. for 40 min), the reaction product was naturally cooled after completion of the reaction to obtain the mixed liquor L4;

(4) Neutralization of the mixed liquor L4 to pH neutral was performed with lime water, the product was subjected to washing with deionized water and then drying at 60° C. in a vacuum oven for 20 h, and subsequently subjected to sufficient grinding in a mortar to prepare a modified polyvinyl acetate (denoted as S2);

Wherein the mass ratio of the deionized water:the vinyl acetate monomer (the first vinyl acetate monomer and the second vinyl acetate monomer):the initiator (the first initiator, the second initiator and third initiator):the butyl acrylate:the acrylic acid was 1:3:0.062:0.5:0.3; the weight ratio of the first vinyl acetate monomer:the second vinyl acetate monomer was 1:3; the initiator was an aqueous solution of ammonium persulfate (the weight ratio of ammonium persulfate:water was 1:10), wherein the weight ratio of the first initiator:the second initiator:the third initiator was 1:0.5:3.75.

Preparation Example 3

(1) Deionized water and oleic acid were placed and blended in an ultrasonic stirrer at room temperature to obtain a homogeneous mixed liquor L1 (with a pH of 5-6); the mixed liquor L1 was disposed in a water bath reactor and a first vinyl acetate monomer was added, the mixture was stirred, mingled and heated to carry out a first reaction (under the reaction temperature 75° C. for 15 min); a first initiator was subsequently added to perform a second reaction (under the reaction temperature 75° C. for 40 min) to obtain a mixed liquor L2;

(2) Lauryl acrylate was sufficiently blended with a second vinyl acetate monomer to form a mixture, when the second reaction in step (1) was finished and there was not a reflux, the mixture and a second initiator were simultaneously added into the mixed liquor L2 at their uniform feed rates so as to perform a third reaction (under the reaction temperature 75° C. for 150 min), the feeding of the mixture and the second initiator was implemented throughout the whole process of the third reaction until the reaction was terminated to obtain a mixed liquor L3;

(3) The mixed liquor L3 was placed in an airtight ultrasonic reactor, the ultrasound (the frequency was 30,000 Hz, the temperature was 65° C., and the time was 6 min) was turned on and a third initiator was added simultaneously to perform a fourth reaction (under the reaction temperature 75° C. for 30 min); the resulting product of the fourth reaction was then heated to carry out a fifth reaction (under the reaction temperature 100° C. for 30 min), the reaction product was naturally cooled after completion of the reaction to obtain the mixed liquor L4;

(4) Neutralization of the mixed liquor L4 to pH neutral was performed with lime water, the product was subjected to washing with deionized water and then drying at 75° C. in a vacuum oven for 28 h, and subsequently subjected to sufficient grinding in a mortar to prepare a modified polyvinyl acetate (denoted as S3);

Wherein the mass ratio of the deionized water:the vinyl acetate monomer (the first vinyl acetate monomer and the second vinyl acetate monomer):the initiator (the first initiator, the second initiator and third initiator):the lauryl acrylate:the oleic acid was 1:1.5:0.06:0.4:0.2; the weight ratio of the first vinyl acetate monomer:the second vinyl acetate monomer was 1:2; the initiator was an aqueous solution of benzoyl peroxide (the weight ratio of benzoyl peroxide:water was 1:10), wherein the weight ratio of the first initiator:the second initiator:the third initiator was 1:0.5:3.75.

Preparation Example 4

(1) Deionized water and butendioic acid were placed and blended in an ultrasonic stirrer at room temperature to obtain a homogeneous mixed liquor L1 (with a pH of 5-6); the mixed liquor L1 was disposed in a water bath reactor and a first vinyl acetate monomer was added, the mixture was stirred, mingled and heated to carry out a first reaction (under the reaction temperature 75° C. for 15 min); a first initiator was subsequently added to perform a second reaction (under the reaction temperature 75° C. for 40 min) to obtain a mixed liquor L2;

(2) N-octyl methacrylate was sufficiently blended with a second vinyl acetate monomer to form a mixture, when the second reaction in step (1) was finished and there was not a reflux, the mixture and a second initiator were simultaneously added into the mixed liquor L2 at their uniform feed rates so as to perform a third reaction (under the reaction temperature 75° C. for 150 min), the feeding of the mixture and the second initiator was implemented throughout the whole process of the third reaction until the reaction was terminated to obtain a mixed liquor L3;

(3) The mixed liquor L3 was placed in an airtight ultrasonic reactor, the ultrasound (the frequency was 30,000 Hz, the temperature was 63° C., and the time was 6 min) was turned on and a third initiator was added simultaneously to perform a fourth reaction (under the reaction temperature 75° C. for 30 min); the resulting product of the fourth reaction was then heated to carry out a fifth reaction (under the reaction temperature 100° C. for 30 min), the reaction product was naturally cooled after completion of the reaction to obtain the mixed liquor L4;

(4) Neutralization of the mixed liquor L4 to pH neutral was performed with lime water, the product was subjected to washing with deionized water and then drying at 75° C. in a vacuum oven for 20 h, and subsequently subjected to sufficient grinding in a mortar to prepare a modified polyvinyl acetate (denoted as S4);

Wherein the mass ratio of the deionized water:the vinyl acetate monomer (the first vinyl acetate monomer and the second vinyl acetate monomer):the initiator (the first initiator, the second initiator and third initiator):the n-octyl methacrylate:the butendioic acid was 1:1.5:0.06:0.4:0.2; the weight ratio of the first vinyl acetate monomer:the second vinyl acetate monomer was 1:2; the initiator was an aqueous solution of potassium persulfate (the weight ratio of potassium persulfate:water was 1:10), wherein the weight ratio of the first initiator:the second initiator:the third initiator was 1:0.5:3.75.

Preparation Example 5

The modified polyvinyl acetate was prepared according to the same method as that of Example 1, except that the ultrasound was not turned on during the fourth reaction process in step (3), the other conditions are identical with those in Example 1. The prepared product was denoted as D1.

Preparation Example 6

The modified polyvinyl acetate was prepared with a soap-free emulsion polymerization process. The prepared product was denoted as D2.

Example 1

100 parts by weight of No. 3 white oil was taken and added with 15 parts by weight of tap water, and were subjected to a high-speed stirring and mixing process to obtain an oil-water mixed liquor; 1 part by weight of an emulsifier (LS-65 mixed with Span-80 in a mass ratio of 3:5), 2 parts by weight of lecithin and 3 parts by weight of a filtrate reducer were added into the oil-water mixed liquor and stirred at a high speed for 5 min; 4 parts by weight of organic soil was then divided into two parts with an equal weight, after the first part was completely dispersed in the mixed liquor, the second part was then slowly added, after the two parts of the organic soil were completely dispersed, 2 parts by weight of calcium oxide was added and stirring at a high speed for 10 min, 2 parts by weight of the modified polyvinyl acetate denoted as S1 was further added, after the ingredients were uniformly dispersed, 15 parts by weight of a weighting agent (the weight ratio of API barite to ultrafine barium sulfate was 7:3, the API barite and the ultrafine barium sulfate are respectively separated into four parts with an equal weight, API barite and ultrafine barium sulfate were added alternately in sequence, the addition was performed for a total of eight times); finally, the entire mixed system was stirred at a high speed for 60 min to produce an oil-based drilling fluid (denoted as F1); wherein the high-speed stirring was performed at a revolving speed of 11,000 rpm.

Example 2

The oil-based drilling fluid was prepared according to the same method as that in Example 1, except that the modified polyvinyl acetate denoted as S2 was used as a plugging agent, the remaining conditions were identical with those of Example 1. An oil-based drilling fluid (denoted as F2) was prepared.

Example 3

The oil-based drilling fluid was prepared according to the same method as that in Example 1, except that the modified polyvinyl acetate denoted as S3 was used as a plugging agent, the remaining conditions were identical with those of Example 1. An oil-based drilling fluid (denoted as F3) was prepared.

Example 4

The oil-based drilling fluid was prepared according to the same method as that in Example 1, except that the modified polyvinyl acetate denoted as S4 was used as a plugging agent, the remaining conditions were identical with those of Example 1. An oil-based drilling fluid (denoted as F4) was prepared.

Comparative Example 1

The oil-based drilling fluid was prepared according to the same method as that in Example 1, except that the modified polyvinyl acetate denoted as D1 was used as a plugging agent, the remaining conditions were identical with those of Example 1. An oil-based drilling fluid (denoted as DF1) was prepared.

Comparative Example 2

The oil-based drilling fluid was prepared according to the same method as that in Example 1, except that the modified polyvinyl acetate denoted as D2 was used as a plugging agent, the remaining conditions were identical with those of Example 1. An oil-based drilling fluid (denoted as DF2) was prepared.

Comparative Example 3

The oil-based drilling fluid was prepared according to the same method as that in Example 1, except that the commercially available nano-graphene was used as a plugging agent, the remaining conditions were identical with those of Example 1. An oil-based drilling fluid (denoted as DF3) was prepared.

Comparative Example 4

The oil-based drilling fluid was prepared according to the same method as that in Example 1, except that the commercially available ordinary polyvinyl acetate (unmodified) was used as a plugging agent, the remaining conditions were identical with those of Example 1. An oil-based drilling fluid (denoted as DF4) was prepared.

Comparative Example 5

The oil-based drilling fluid was prepared according to the same method as that in Example 1, except that the commercially available nano-calcium carbonate was used as a plugging agent, the remaining conditions were identical with those of Example 1. An oil-based drilling fluid (denoted as DF5) was prepared.

Comparative Example 6

The oil-based drilling fluid was prepared according to the same method as that in Example 1, except that the commercially available oxidized asphalt was used as a plugging agent, the remaining conditions were identical with those of Example 1. An oil-based drilling fluid (denoted as DF6) was prepared.

Comparative Example 7

The oil-based drilling fluid was prepared according to the same method as that in Example 1, except that the drilling fluid was prepared with the formula comprising: 100 parts by weight of No. 3 white oil, 30 parts by weight of tap water, 1 part by weight of organic soil, 6 parts by weight of an emulsifier (LS-65 mixed with Span-80 in a mass ratio of 6:1), 1 part by weight of lecithin, 5 parts by weight of calcium oxide, 8 parts by weight of the modified polyvinyl acetate denoted as S1, 40 parts by weight of a weighting agent (consisting of API barite and ultrafine barium sulfate in a weight ratio of 7:3) and 2 parts by weight of a filtrate reducer. An oil-based drilling fluid (denoted as DF7) was prepared.

Comparative Example 8

The oil-based drilling fluid was prepared according to the same method as that in Example 1, except that the modified polyvinyl acetate denoted as S1 was not added into the drilling fluid, the remaining conditions were identical with those of Example 1. An oil-based drilling fluid (denoted as DF8) was prepared.

Test Example

The products S1-S4, D1-D2 prepared in the preparation examples 1-6 were subjected to particle size test and contact angle test for evaluating the lipophilicity and dispersibility thereof; the oil-based drilling fluid F1-F4 prepared in examples 1-4 and the oil-based drilling fluid DF1-DF8 prepared in comparative examples 1-8 were subjected to testing of plugging performance, high temperature resistance and compatibility performance. In the following test examples, Apparent viscosity (AV, mPa·s), plastic viscosity (PV, mPa·s), dynamic shear force (YP, Pa) were measured with a six speed rotational viscometer according to the method specified in the National Standard GB/T29170-2012 of China;

Medium pressure filtrate loss (API, mL) was measured with a medium pressure filtrate loss meter according to the method specified in the National Standard GB/T29170-2012 of China;

High temperature high pressure filtrate loss (HTHP, mL) was measured with a high temperature high pressure filtrate loss meter according to the method specified in the National Standard GB/T29170-2012 of China;

The manufacturer of the laser granularity instrument was Malvern Instrument Company in the United Kingdom;

The manufacture of the contact angle gauge with a model number SDC-350 was Chengdu Snow Leopard Technology Co., Ltd.;

The manufacturer of the six speed rotational viscometer with a model number ZNN-D6S was Beijing Sidilaibo Oil & Gas Technology Co., Ltd.;

The manufacturer of the medium pressure medium pressure filtrate loss meter with a model number SD4/SD4A was Beijing Sidilaibo Oil & Gas Technology Co., Ltd.;

The manufacturer of the high temperature high pressure filtrate loss meter with a model number KC-GS173 was Ken Test Instrument Co., Ltd.

1. Particle Size and Contact Angle

Particle size test: the plugging agents S1-S4, D1-D2 were added into white oil, and subjected to sufficiently stirring, the particle size of the plugging agents after being dispersed in the white oil was measured by using a laser particle size meter, and the degree of dispersion was observed.

Contact angle test: 300 mg of the plugging agents S1-S4, D1-D2 were respectively weighted, and fabricated into a sample slice by using a tablet machine, the contact angles of white oil and distilled water on the slice surface were measured respectively by using a contact angle gauge.

The results were shown in Table 1.

TABLE 1

| Test objects | Particle size/nm | Contact with white oil | Contact angle with distilled water/° | Degree of dispersion in white oil |
|---|---|---|---|---|
| S1 | 65 | Completely spread | 133 | No agglomeration |
| S2 | 74 | Completely spread | 120 | No agglomeration |
| S3 | 87 | Completely spread | 116 | No agglomeration |
| S4 | 92 | Completely spread | 109 | No agglomeration |
| D1 | 826 | Partially spread | 84 | Partially agglomerated |
| D2 | 1023 | Partially spread | 82 | Obviously agglomerated |

As can be seen from Table 1, the plugging agents S1-S4 had the particle sizes within a range of 65-100 nm and the contact angles with distilled water within a range of 109°-133°, the agglomeration phenomenon did not occur in the white oil phase, which indicated that the modified polyvinyl acetate of the present disclosure had small particle size and stronger lipophilicity, and exhibited excellent dispersibility in an oil phase, and can meet the requirements of plugging the micro-pores and cracks in the mud shale stratum. The preparation example 5 indicated that the airtight ultrasonic treatment was not performed in the fourth reaction of preparation process, its prepared product D1 had a reduced lipophilicity as compared with the products S1-S4, and formed an agglomeration phenomenon in oil phase; the preparation example 6 did not use the preparation method of the present application, the obtained product D2 exhibited poor lipophilicity and cannot meet the requirements of an use in the oil-based drilling fluid system.

2. Plugging Performance and High Temperature Resistance Property

The plugging performance was evaluated by a medium pressure filtrate loss, and the plugging performance was initially judged by the magnitude of filtrate loss, and then the permeability of drilling fluids was calculated based on the parameters such as an average filtrate loss q (cm³/s) per unit time, mud cake thickness l (mm), drilling fluid viscosity μ (mPa·s), mud cake area A (m²) and pressure differential ∇P (MPa), in order to reflect the plugging performance of the plugging agent in a more accurate manner. The plugging performance was ultimately evaluated based on the magnitude of permeability reduction rate of the drilling fluids, the higher was the permeability reduction rate, indicating that the plugging performance of the plugging agents was better, the related calculation formula was as follows:

Permeability of drilling liquid $K = q \cdot l \cdot \mu / (A \cdot \nabla P)$ (1)

Permeability reduction rate of drilling fluid $$K' = \frac{K_0 - K}{K_0} \times 100\% \quad (2)$$

Where, $K_0$ denoted the permeability of penetrated medium;

K denoted the permeability of drilling fluids

Test procedure of the temperature resistance performance of the plugging agents: the drilling fluid sample was placed in an aging tank and subjected to a high-temperature aging experiment in a high-temperature roller heating furnace at 220° C. for 16 hours, and the high-temperature aged drilling fluid was then subjected to high-temperature high-pressure filtrate loss test under the temperature of 170° C. and the pressure of 3.5 MPa, the plugging performance of the plugging agent at high temperature was evaluated based on the magnitude of the high-temperature high-pressure filtrate loss.

The results were shown in Table 2.

TABLE 2

| Drilling fluids | $FL_{API}$/ mL | $FL_{HTHP}$/ mL | Permeability of penetrated medium/mD | Permeability of drilling fluids/ mD | Permeability reduction rate/% |
|---|---|---|---|---|---|
| F1 | 1.0 | 4.0 | $4.33 \times 10^{-4}$ mD | $1.12 \times 10^{-4}$ mD | 74.13 |
| F2 | 1.3 | 4.7 | $4.33 \times 10^{-4}$ mD | $1.24 \times 10^{-4}$ mD | 71.36 |
| F3 | 1.5 | 5.0 | $4.33 \times 10^{-4}$ mD | $1.43 \times 10^{-4}$ mD | 66.97 |
| F4 | 1.7 | 5.3 | $4.33 \times 10^{-4}$ mD | $1.51 \times 10^{-4}$ mD | 65.13 |
| DF1 | 2.6 | 6.6 | $4.33 \times 10^{-4}$ mD | $2.76 \times 10^{-4}$ mD | 36.26 |
| DF2 | 3.3 | 7.0 | $4.33 \times 10^{-4}$ mD | $2.80 \times 10^{-4}$ mD | 35.33 |
| DF3 | 1.9 | 6.0 | $4.33 \times 10^{-4}$ mD | $1.92 \times 10^{-4}$ mD | 55.65 |
| DF4 | 3.8 | 7.8 | $4.33 \times 10^{-4}$ mD | $2.83 \times 10^{-4}$ mD | 34.64 |
| DF5 | 4.5 | 8.3 | $4.33 \times 10^{-4}$ mD | $2.91 \times 10^{-4}$ mD | 32.79 |
| DF6 | 1.9 | 5.9 | $4.33 \times 10^{-4}$ mD | $1.85 \times 10^{-4}$ mD | 57.27 |
| DF7 | 1.7 | 5.8 | $4.33 \times 10^{-4}$ mD | $1.70 \times 10^{-4}$ mD | 60.74 |
| DF8 | 6.8 | 12.8 | $4.33 \times 10^{-4}$ mD | $3.15 \times 10^{-4}$ mD | 27.25 |

As can be seen from Table 2, the plugging agent used in the drilling fluids F1-F4 was the modified polyvinyl acetate provided by the present disclosure, the drilling fluids F1-F4 had small medium pressure filtrate loss and high temperature high pressure filtrate loss; while the plugging agents used in the drilling fluids DF1-DF6 were the plugging agents which were not prepared according to the method of the present disclosure, the conventional plugging agent or the unmodified polyvinyl acetate; the drilling fluid DF8 did not use a plugging agent, resulting in a relatively significant increase in the filtrate loss for the drilling fluids DF1-DF6 and DF8, it indicated that the modified polyvinyl acetate provided by the present disclosure had desirable filtrate loss reduction performance and plugging property. Based on the comparison of permeability reduction rates of drilling fluids, the permeability reduction rates of drilling fluids F1-F4 were significantly higher than the drilling fluids DF1-DF6 and DF8, the favorable effect was produced by that the modified polyvinyl acetate of the present disclosure had desirable lipophilic property and high temperature resistance performance, can be uniformly dispersed in an oil-based drilling system fluid, such that the drilling fluids F1-F4 still retained the desired plugging performance at the high temperature 220° C. In particular, the drilling fluid F7 did not use the oil-based drilling fluid formulation of the present application, its plugging performance has a certain gap compared to the drilling fluids F1-F4.

3. Compatibility

An oil-based drilling fluid base slurry A was prepared by mixing 100 parts by weight of No. 3 white oil, 15 parts by weight of tap water, 4 parts by weight of an organic soil, 1 part by weight of an emulsifier (LS-65 and Span-80 were mixed in a mass ratio of 3:5), 2 parts by weight of lecithin, 15 parts by weight of a weighting agent (consisting of API barite and ultrafine barium sulfate in a weight ratio of 7:3), 3 parts by weight of a filtrate reducer, 2 parts by weight of calcium oxide, the base slurry A was then added with 2 parts by weight of the modified polyvinyl acetate denoted as S1 prepared in the reparation example 1, so as to prepare an oil-based drilling fluid B.

The density and rheological parameters of the base slurry A at ambient temperature were measured, the density and rheological parameters of the base slurry B at ambient temperature and after subjected to an aging process (under the temperature of 220° C. for 16 h) were measured respectively, the results were shown in Table 3.

TABLE 3

| Drilling fluids | ρ g/cm³ | AV mPa · s | PV mPa · s | YP Pa | YP/PV Pa/(mPa · s) |
|---|---|---|---|---|---|
| A (ambient temperature) | 1.74 | 40.5 | 28.5 | 12.26 | 0.43 |
| B (ambient temperature) | 1.74 | 41.8 | 30.3 | 12.28 | 0.41 |
| B (aged) | 1.74 | 38.3 | 25.1 | 11.2 | 0.45 |

Table 3 illustrated that the addition of the modified polyvinyl acetate plugging agent of the present disclosure had a small influence on the rheological property of oil-based drilling fluids, especially the aged drilling fluids had low variation in the rheological parameters and exhibited excellent rheological property, indicating that the modified polyvinyl acetate provided by the present disclosure had desirable compatibility as a plugging agent for oil-based drilling fluids.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A method of preparing a modified polyvinyl acetate including:
    (1) subjecting a mixed liquor L1 comprising a functional monomer to a first reaction with a first vinyl acetate monomer, then adding a first initiator to carry out a second reaction to obtain a mixed liquor L2;
    (2) subjecting an acrylate monomer, a second vinyl acetate monomer, a second initiator and the mixed liquor L2 to carry out a third reaction to obtain a mixed liquor L3;
    (3) subjecting a third initiator and the mixed liquor L3 to carry out a fourth reaction under the airtight and ultrasonic conditions, subsequently heating products produced by the fourth reaction to a fifth reaction to obtain a mixed liquor L4;
    (4) subjecting the mixed liquor L4 to a product extraction treatment to prepare a modified polyvinyl acetate;
    wherein the functional monomer is selected from acrylic acid, oleic acid or butenedioic acid.

2. The method of claim 1, wherein the weight ratio of the first vinyl acetate monomer to the second vinyl acetate monomer is 1:(2-3).

3. The method of claim 1, wherein the weight ratio of the first initiator:the second initiator to the third initiator is 1:(0.2-0.7):(3-4).

4. The method of claim 1, wherein the mass ratio of vinyl acetate monomer comprising the first vinyl acetate monomer and the second vinyl acetate monomer:initiator comprising the first initiator, the second initiator and third initiator:the acrylate monomer:the functional monomer is (1.5-3):(0.05-0.07):(0.3-0.5):(0.1-0.3).

5. The method of claim 4, wherein the mass ratio of vinyl acetate monomer comprising the first vinyl acetate monomer and the second vinyl acetate monomer:initiator comprising the first initiator, the second initiator and third initiator:the acrylate monomer:the functional monomer is (2.6-3):(0.055-0.062):(0.45-0.5):(0.24-0.3).

6. The method of claim 1, wherein the functional monomer is selected from acrylic acid, oleic acid or butenedioic acid; and/or
    the acrylate monomer is selected from the group consisting of ethyl acrylate, butyl acrylate, isooctyl acrylate, lauryl methacrylate or n-octyl methacrylate; and/or
    the first initiator, the second initiator and the third initiator are the same and are selected from the aqueous solutions of sodium persulfate, potassium persulfate, ammonium persulfate, hydrogen peroxide or benzoyl peroxide.

7. The method of claim 1, wherein the conditions of the first reaction comprise a temperature of 60-90° C. and a time of 15-20 min; and/or
    the conditions of the second reaction comprise a temperature of 60-90° C. and a time of 40-60 min; and/or
    the conditions of the third reaction comprise a temperature of 60-90° C. and a time of 150-240 min; and/or
    the conditions of the fourth reaction comprise a temperature of 60-90° C. and a time of 30-45 min; and/or
    the conditions of the fifth reaction comprise a temperature of 90-110° C. and a time of 30-40 min; and/or
    the airtight and ultrasonic conditions include a frequency of 26,000-35,000 Hz, a temperature of 60-65° C. and a time of 3-8 min.

8. The method of claim 1, wherein the product extraction treatment comprises neutralizing with lime water, washing, drying and grinding.

9. A modified polyvinyl acetate produced with the method of claim 1.

10. The modified polyvinyl acetate of claim 9, wherein the modified polyvinyl acetate has an average particle size of 65-100 nm.

11. The modified polyvinyl acetate of claim 10, wherein the modified polyvinyl acetate has an average particle size of 65-93 nm.

12. An oil-based drilling fluid comprising the modified polyvinyl acetate of claim 9.

13. The oil-based drilling fluid of claim 12, wherein the oil-based drilling fluid comprising: 100 parts by weight of base fluid, 15-20 parts by weight of water, 3-6 parts by weight of organic soil, 1-3 parts by weight of emulsifier, 2-4 parts by weight of wetting agent, 1-4 parts by weight of modified polyvinyl acetate, 15-35 parts by weight of weighting agent, 3-5 parts by weight of filtrate reducer, 1-3 parts by weight of calcium oxide.

14. The oil-based drilling fluid of claim 13, wherein the base fluid is selected from No. 3 white oil, No. 5 white oil or diesel oil.

15. The oil-based drilling fluid of claim 14, wherein the base fluid is No. 3 white oil.

16. The oil-based drilling fluid of claim 13, wherein the organic soil is an oleophilic clay prepared through an interaction of a hydrophilic bentonite and a quaternary ammonium salt cationic surfactant.

17. The oil-based drilling fluid of claim 13, wherein the wetting agent is lecithin; and/or
    the weighting agent is at least one selected from the group consisting of API barite, ultrafine barium sulfate, magnetite powder, titaniferous powder, and trimanganese tetroxide.

18. The oil-based drilling fluid of claim 13, wherein the API barite is mixed with ultrafine barium sulfate in a mass ratio (5-7):(2-3).

* * * * *